(12) United States Patent
Nishiura (10) Patent No.: US 6,381,296 B1
(45) Date of Patent: Apr. 30, 2002

(54) APPARATUS AND A METHOD FOR PROCESSING A MEDICAL IMAGE

(75) Inventor: Masahide Nishiura, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/714,964

(22) Filed: Nov. 20, 2000

(30) Foreign Application Priority Data

Dec. 7, 1999 (JP) ............................................ 11-347865

(51) Int. Cl.⁷ ................................................. A61B 6/03
(52) U.S. Cl. ............................................. 378/4; 378/901
(58) Field of Search ........................... 378/4, 8, 15, 901

(56) References Cited

U.S. PATENT DOCUMENTS 5,546,807 A * 8/1996 Oxaal et al. ................... 73/606
5,954,650 A * 9/1999 Saito et al. ................... 600/425

FOREIGN PATENT DOCUMENTS

| JP | 5-233824 | 9/1993 |
| JP | 7-334702 | 12/1995 |

* cited by examiner

Primary Examiner—David V. Bruce
(74) Attorney, Agent, or Firm—Oblon, Spivak, McClelland, Maier & Neustadt, P.C.

(57) ABSTRACT

An apparatus processes a medical image. A three-dimensional data acquisition unit acquires three-dimensional data of a plurality of objects for diagnosis of a living body. A three-dimensional data memory stores the three-dimensional data of each of the plurality of objects for diagnosis. A sectional position memory stores a plurality of sectional positions for each of the plurality of objects for diagnosis. A selector selects one of the plurality of objects for diagnosis. An image generation unit generates a plurality of sectional images using the three-dimensional data corresponding to the one of the plurality of objects for diagnosis. Each image is along a different sectional position in the one of the plurality of objects for diagnosis.

21 Claims, 8 Drawing Sheets

APPARATUS AND A METHOD FOR PROCESSING A MEDICAL IMAGE

FIELD OF THE INVENTION

The present invention relates to an apparatus and a method for processing a medical image to display a plurality of sectional images of the user's desired object for diagnosis.

BACKGROUND OF THE INVENTION

In recent years, computer tomography (CT) by X rays is widely used. A plurality of tomographic images are taken by the computer tomography and three-dimensional images are obtained based on the plurality of tomographic images. A slice of an earliest CT image is thick and it takes a long time to take a large number of tomographic images. Accordingly, two-dimensional tomographic image is only used. However, recently, a large number of tomographic images are easily obtained for a short time and the three-dimensional image is also used.

As shown in Japanese Patent Disclosures (Kokai) PH5-233824 and PH7-334702, in a medical image processing apparatus for displaying sectional information of voxel data (a small cube), a technique to obtain a plurality of arbitrary sectional images or a technique to indicate a sectional position of fixed posture such as a cross section, an arrow section, or a coronary section by one point in order to display these sections is disclosed. However, in the former, while the plurality of arbitrary sectional images are obtained, a position and a posture of these sectional images are not memorized and the user's desired image is not obtained. In the latter, while the sectional position of fixed posture such as the cross section, the arrow section, or the coronary section is indicated by one point, these sectional positions are not memorized and the user's desired image is not displayed.

Furthermore, in this known apparatus, in case of adjusting the posture of a plurality of sections, a position and a posture must be adjusted for each section. Accordingly, it takes a long time for the user to adjust the position and the posture of all sections. For example, in the medical field of one application area of the present invention, a plurality of sectional positions used for diagnosis are almost determined in a living body and a positional relation among the plurality of sectional positions is fixed. Nevertheless, in the above-mentioned apparatus, in order to adjust the position and the posture of the plurality of sections, adjustment of one time is respectively necessary for each section. In short, adjustments of plural times are necessary for the plurality of sections. In addition to this, a memory to store the plurality of sectional positions is not prepared. Accordingly, in order to adjust the sectional position and posture for the purpose, a large scale of adjustment is required for the user from an initial position of each section. In short, these operations are very troublesome for the user.

SUMMARY OF THE INVENTION

It is an object of the present invention to provide an apparatus and a method for processing a medical image to arbitrarily adjust a position and a posture of a plurality of sections in order to display the user's desired sectional images.

According to the present invention, there is provided an apparatus for processing a medical image, comprising: a three-dimensional data acquisition unit configured to acquire three-dimensional data of a plurality of objects for diagnosis of a living body; a three-dimensional data memory configured to store the three-dimensional data of each of the plurality of objects for diagnosis; a sectional position memory configured to store a plurality of sectional positions for each of the plurality of objects for diagnosis; a selector configured to select one of the plurality of objects for diagnosis; and an image generation unit configured to generate a plurality of sectional images, each image being along a different sectional position, using the three-dimensional data corresponding to the one of the plurality of objects for diagnosis.

Further in accordance with the present invention, there is also provided a method for processing a medical image, comprising the steps of: acquiring three-dimensional data of a plurality of objects for diagnosis of a living body; storing the three-dimensional data of each of the plurality of objects for diagnosis; storing a plurality of sectional positions for each of the plurality of objects for diagnosis; selecting one of the plurality of objects for diagnosis; and generating a plurality of sectional images, each image being along a different sectional position, using the three-dimensional data corresponding to the one of the plurality of objects for diagnosis.

Further in accordance with the present invention, there is also provided a computer-readable memory containing computer-readable instructions to process a medical image, comprising: an instruction unit for causing a computer to acquire three-dimensional data of a plurality of objects for diagnosis of a living body; an instruction unit for causing a computer to store the three-dimensional data of each of the plurality of objects for diagnosis; an instruction unit for causing a computer to store a plurality of sectional positions for each of the plurality of objects for diagnosis; an instruction unit for causing a computer to select one of the plurality of objects for diagnosis; and an instruction unit for causing a computer to generate a plurality of sectional images, each image being along a different sectional position, using the three-dimensional data corresponding to the one of the plurality of objects for diagnosis.

DETAILED DESCRIPTION OF THE PREFERRED EMBODIMENTS

Figure 1:
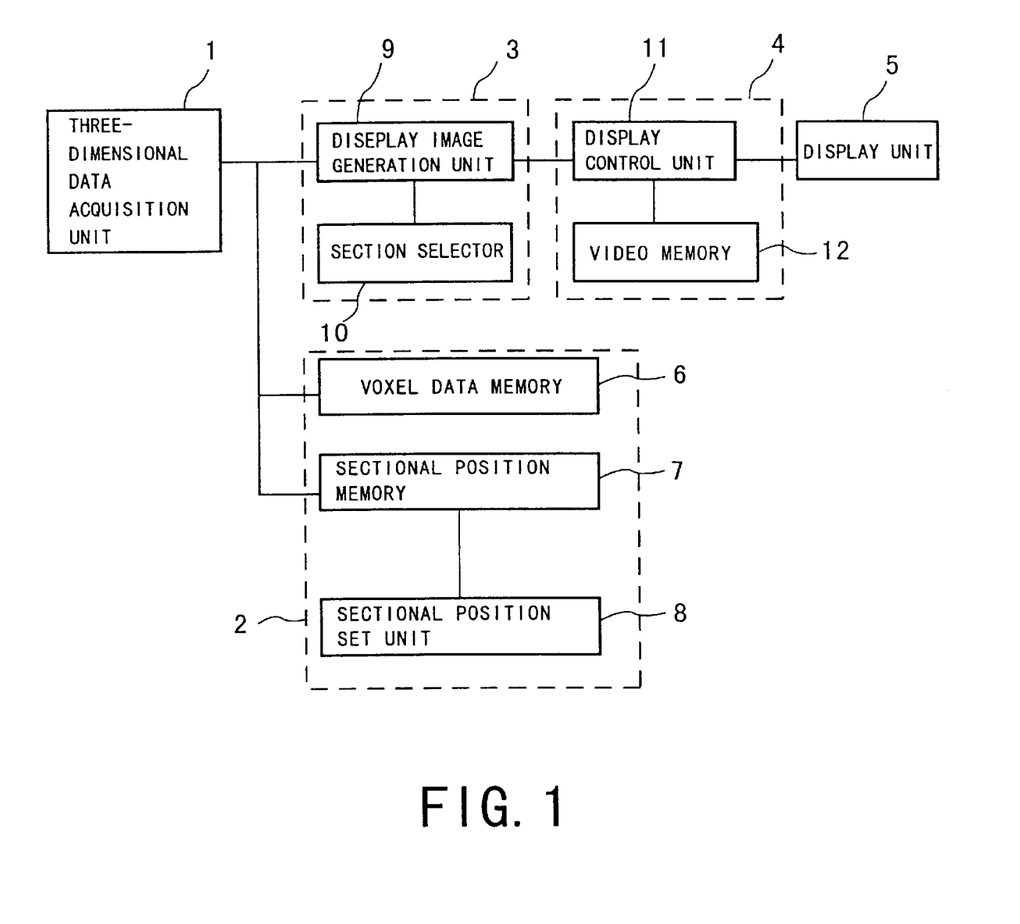
FIG. 1 is a block diagram of the apparatus for processing a medical image according to the present invention.
Figure 2:
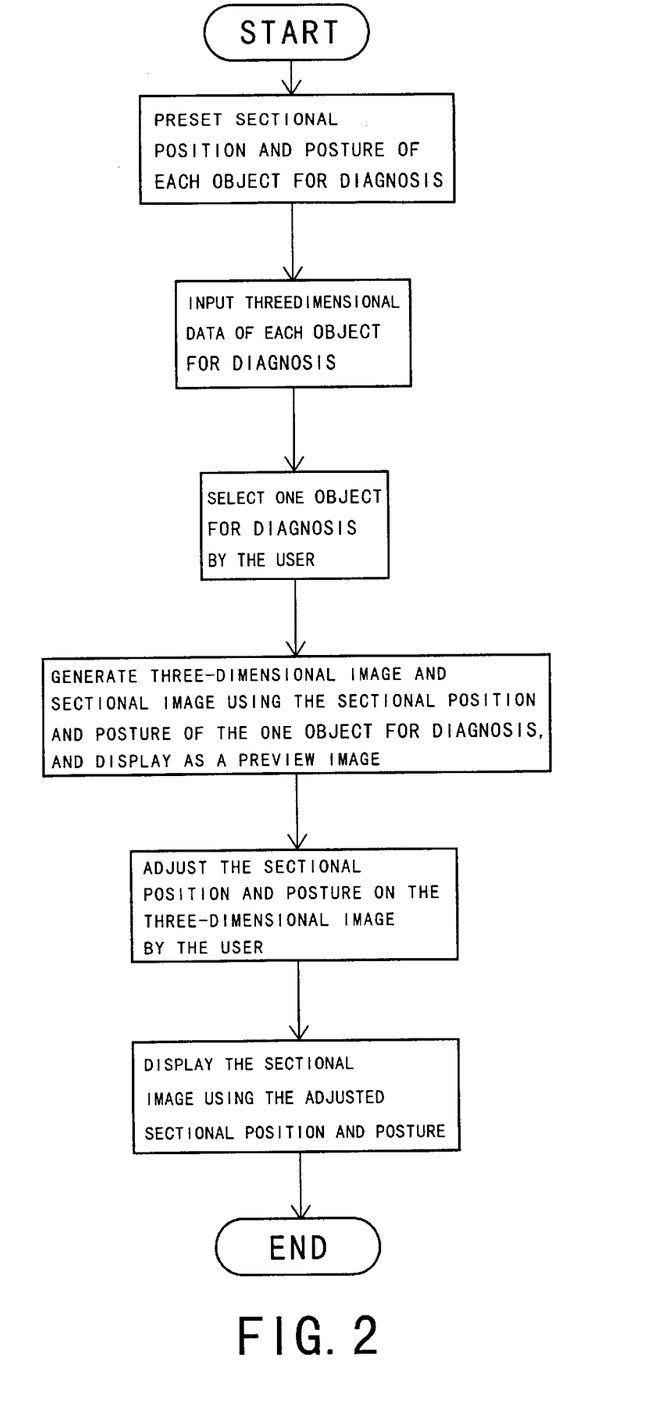
FIG. 2 is a flow chart of processing of the method for processing a medical image according to the present invention.

Hereinafter, embodiments of the present invention are described below with reference to the drawings. FIG. 1 is a block diagram of the apparatus of processing a medical image according to the present invention. FIG. 2 is a flow chart of processing of the method for processing a medical image according to the present invention. In the apparatus for processing a medical image shown in FIG. 1, a plurality of tomographic images of an object for diagnosis are input by three-dimensional scan of the medical image processing apparatus such as CT (computer tomography),MRI (magnetic resonance imaging), an ultrasound system, PET (positron emission tomography), and SPECT (single-photon-emission computed tomography). Three-dimensional images are created from the plurality of tomographic images and displayed in actual space through a three-dimensional display. Furthermore, a tomographic image at the indicated sectional position is displayed through a two-dimensional display.

In FIG. 1, a three-dimensional data acquisition unit 1 acquires three-dimensional voxel data (three-dimensional information) from tomographic images of the object for diagnosis. The tomographic images are obtained by scan prepared in a CT apparatus or an MRI apparatus. A memory unit 2 stores three-dimensional voxel data acquired by the three-dimensional data acquisition unit 1. An image generation unit 3 generates a display image from the three-dimensional voxel data acquired by the three-dimensional data acquisition unit 1 and the data stored in the memory unit 2. A control unit 4 controls displaying of the display image generated by the image generation unit 3. A display unit 5 is a liquid crystal display or a CRT display to present the generated image to the user.

Figure 3:
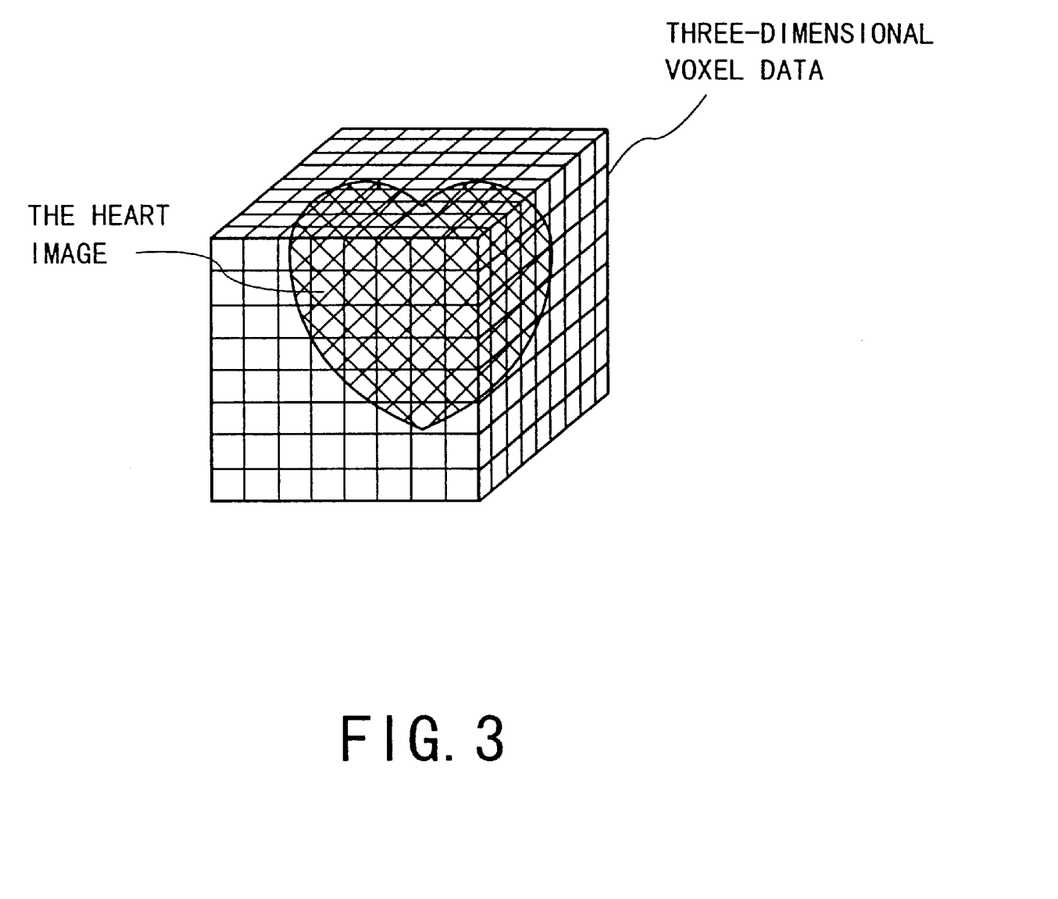
FIG. 3 is a schematic diagram of a heart image in three-dimensional voxel data.

Especially, as shown in FIG. 1, the memory unit 2 consists of a voxel data memory 6 for storing voxel data, a sectional position memory 7 for storing position data of each section, and a sectional position set unit 8 for setting the sectional position as adjustment. FIG. 3 is a schematic diagram of voxel data representing a heart image in a cube consisting of small voxels. The voxel data memory 6 stores the tomographic image in this voxel format. The image generation unit 3 consists of a display image generation unit 9 for generating the display image by referring to the voxel data and the sectional position, and a section selector for selecting one section group (one object for diagnosis in a living body) from a plurality of section groups (a plurality of objects for diagnosis). The display control unit 4 consists of a display control unit 11 for controlling image output through the display unit 5, and a video memory 12 for temporarily storing the display image.

Next, the processing of the apparatus for processing a medical image is explained.

(1) A plurality of tomographic images taken by the medical image processing apparatus are acquired by the three-dimensional acquisition unit as a three-dimensional image consisting of voxel data of the object for diagnosis. The three-dimensional image is stored in the voxel data memory 6. Ordinally, each voxel data is represented as binary data. In this case, the sectional position memory 7 stores positions and postures of a plurality of sections. The positions and postures of the plurality of sections for each object for diagnosis are previously set as initial positions and postures. Concretely, as for each section, a coordinate (x, y, z) of a basis point on the sectional plane, a normal vector $\vec{n}$ on the sectional plane, and a vector $\vec{u}$ perpendicular to the normal vector are stored. The normal vector $\vec{n}$ and the orthogonal vector $\vec{u}$ are represented as follows.

$$\vec{n} = (a, b, c), \vec{u} = (d, e, f)$$

The vector $\vec{u}$ represents a vector along X axis direction on the sectional image. Accordingly, the sectional position memory 7 stores the following parameters for each section.

(x, y, z, a, b, c, d, e, f)

In the present invention, the following parameters for n sections (n: natural number) are regarded as one section group (one object for diagnosis).

$\{(x1, y1, z1, a1, b1, c1, d1, e1, f1), \ldots, (xn, yn, zn, an, bn, cn, dn, en, fn)\}$ For example, a living body includes a plurality of objects for diagnosis such as the heart, the brain, the lungs, the liver, the stomach, and so on. As for each object for diagnosis, positions and postures of a plurality of sections (n sections) are predetermined. Accordingly, the above parameters of n sections of each object for diagnosis are stored. In this case, the parameters of n sections of one object for diagnosis are called one section group.

Figure 4A:
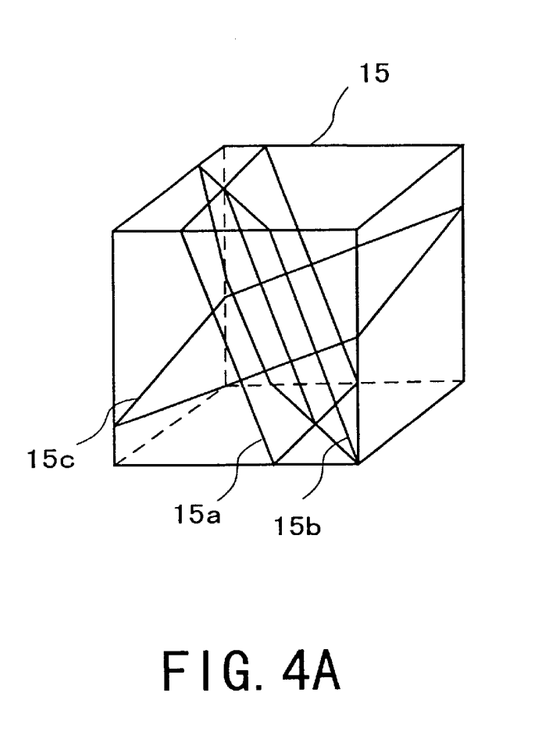
FIGS. 4A and 4B are schematic diagrams of three-dimensional data representing a sectional position and three sectional images corresponding to each sectional position according to the present invention.
Figure 4B:
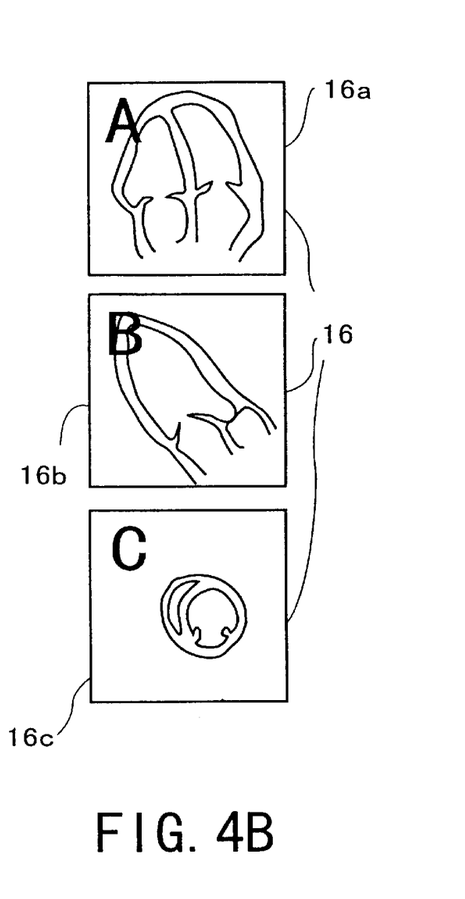

(2) One section group is selected by the section selector 10. In response to the selection, the display image generation unit 9 retrieves the parameters of n sections of the one selection group from the sectional position memory 7, and generates a three-dimensional image representing sectional positions and n sectional images by referring to the voxel data and the parameter. FIG. 4A shows the three-dimensional image 15 representing sectional positions of n sections. FIG. 4B shows three sectional images 16 (n sectional images) corresponding to each sectional position. In FIG. 4A, the three-dimensional image 15 is represented by volume-rendering in three-dimensional space. In FIG. 4B, each sectional image 16a, 16b, 16c respectively corresponds to sectional position 15a, 15b, 15c in FIG. 4A. In this case, the sectional positions 15a, 15b, 15c are variously set by the sectional position set unit 8 in order to display the user's desired sectional image. For example, as shown in FIG. 4A, two vertical sections and one horizontal section are included. However, three vertical sections may be set. Alternatively, the number of sectional images may be arbitrarily set.

Figure 5:
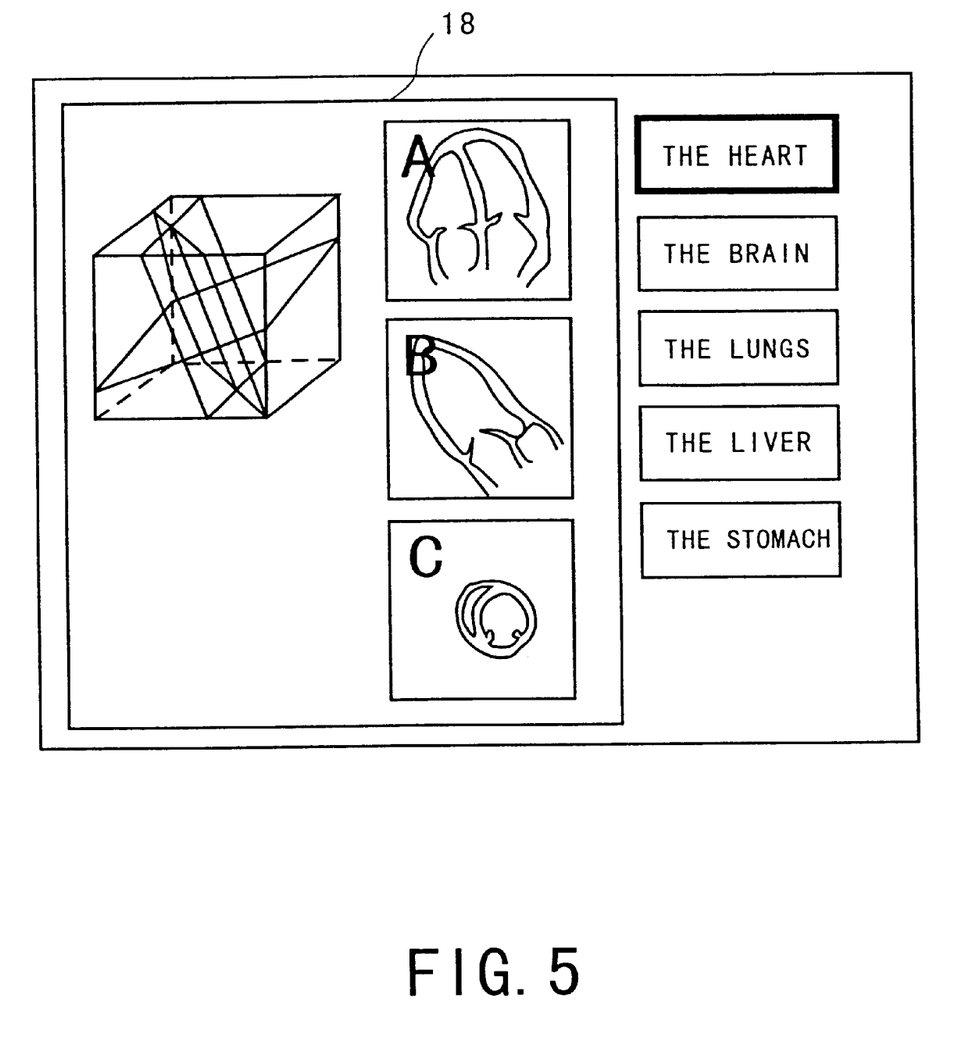
FIG. 5 is a schematic diagram of a screen including the three-dimensional data and three sectional images corresponding to one object for diagnosis according to the present invention.

(3) The three-dimensional image and the sectional images generated by the image generation unit 9 are stored in the sectional position memory 7. As mentioned-above, information of a plurality of section groups generated is also stored in the sectional position memory 7. FIG. 5 shows a preview image in order for the user to select the object for diagnosis and to adjust the sectional positions. As shown in the right side in FIG. 5, names of a plurality of objects for diagnosis in a living body are displayed. In this example, names of five objects for diagnosis present in the sectional position memory 7 are displayed. As for each object for diagnosis, a plurality of sectional positions are predetermined as the initial sectional position. In FIG. 5, the user selects one object for diagnosis "the heart". In this case, the section selector 10 selects three sectional positions of the heart from the sectional position memory 7. The display image generation unit 9 generates three sectional images by referring to the three sectional positions and voxel data of the heart in the voxel data memory 6. In this way, as shown in the left area of FIG. 5, the three sectional images "A, B, C" and the three sectional positions are displayed as a preview image 18. The user confirms the sectional images by watching the preview image 18. In this case, the user can adjust (change)

the sectional positions in the three-dimensional image. The adjusted (changed) sectional positions are updately stored in the sectional position memory 7 if necessary. Furthermore, the sectional positions in the three-dimensional image may be displayed by other rendering methods.

Figure 6:
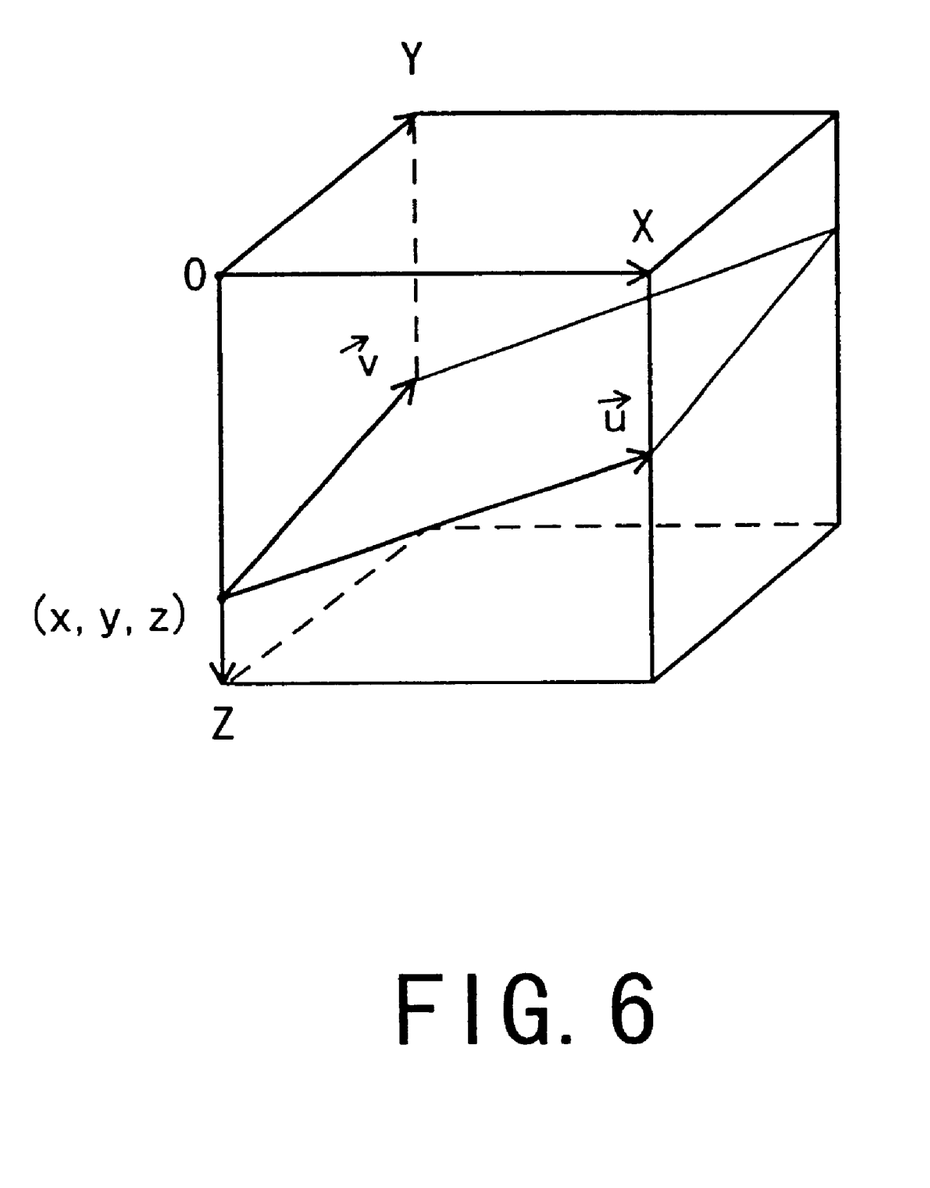
FIG. 6 is a schematic diagram showing a position of a two-dimensional coordinate axis of the section in three-dimensional basis coordinate axis.

Next, a method for generating the sectional image is explained. First, an outer product $\vec{v}$ of the normal vector $\vec{n}$ and the vector $\vec{u}$ is calculated. In this case, as shown in FIG. 6, the vector $\vec{u}$ represents the X axis direction on the sectional image and the vector $\vec{v}$ represents the Y axis direction on the sectional image. In order to generate the sectional image, a pixel value of a lattice point on a sectional plane defined by vectors "$\vec{u}$, $\vec{v}$" from a basis point (x, y, z) is calculated. Actually, the pixel value is obtained by interpolation of voxel values neighboring each lattice point.

Figure 7:
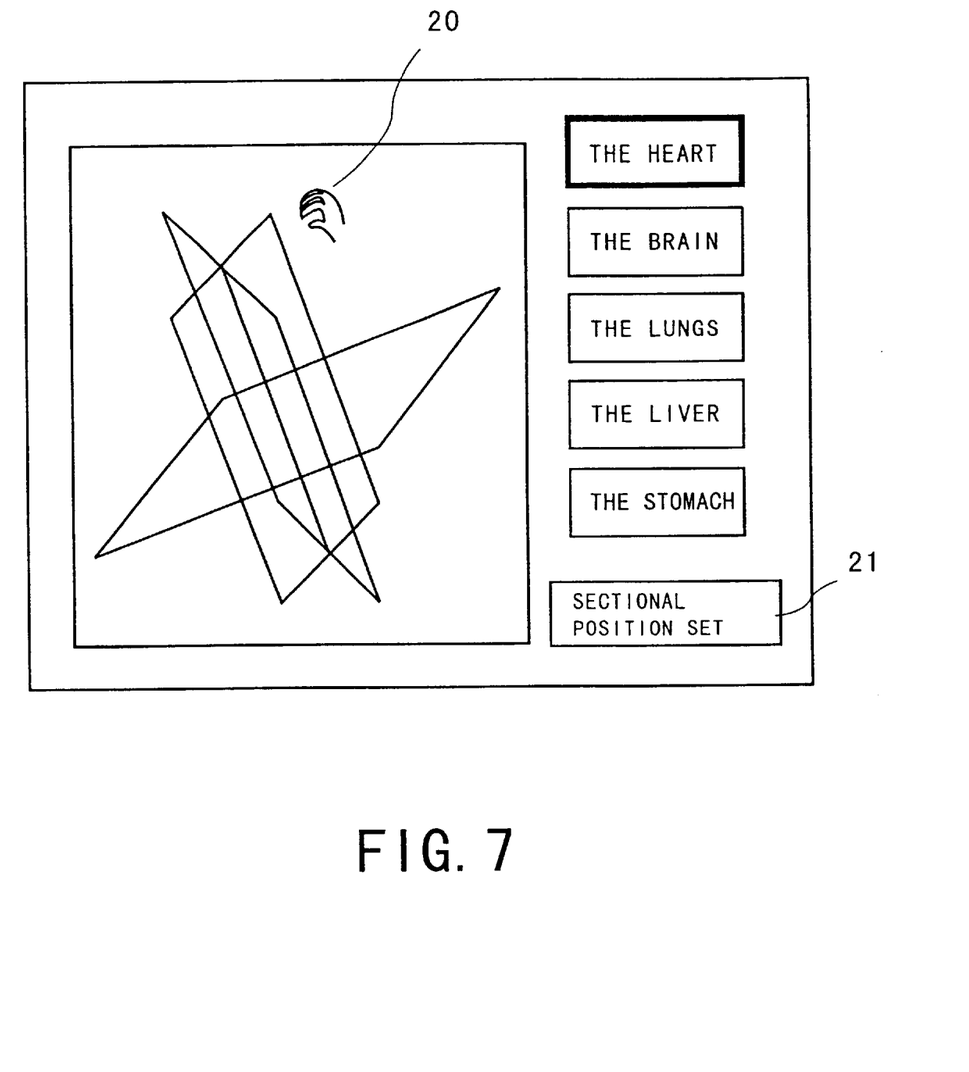
FIG. 7 is a schematic diagram of screen including the three-dimensional data, three sectional images, and a user interface at adjustment mode of sectional position according to the present invention.
Figure 8:
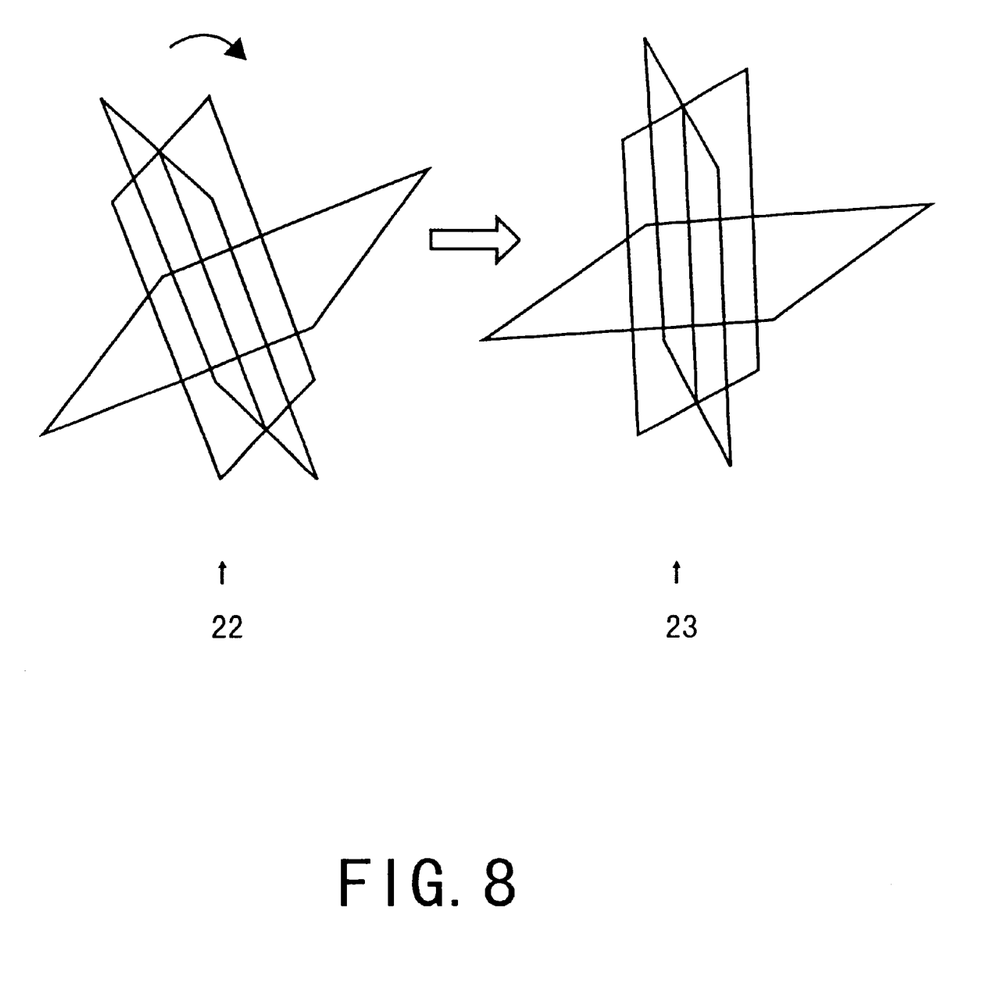
FIG. 8 is a schematic diagram of an adjustment of a plurality of sectional positions by the user's operation according to the present invention.

Next, operation of the sectional position set unit 8 is explained. As shown in FIG. 7, in a mode to set the sectional position, a user interface 20 and a sectional position set icon 21 are displayed in the preview image. As mentioned-above in FIG. 5, assume that the user already selects one object for diagnosis "the heart", and three sectional positions of the heart and already displayed as original sectional positions in the preview image. In this situation, the user operates a mouse or a slider (not shown in FIG. 1) in this computer system. The user interface (cursor) 20 is moved in cooperation with the user's operation. In this case, as shown in FIG. 8, the three sectional positions rotate (adjust) from an original position 22 to a new position 23 as one body by the cursor's moving. When the three sectional positions change to the user's desired position in the preview image, the user indicates the sectional position set 21 in FIG. 7 by the mouse. In this case, the adjusted three sectional positions are updately stored in the sectional position memory 7. Then, three sectional images corresponding to the adjusted three sectional positions are newly displayed as shown in FIG. 5. In this way, the user can adjust a plurality of sectional positions at one time by simple operation while the user monitors the plurality of sectional positions in the preview image.

In FIG. 8, all sectional positions change as one body by the user's operation. However, one sectional position in all sectional positions may be changed by the user's selection operation. In this case, the sectional image corresponding to the one sectional position is updately displayed in order for the user to monitor.

The adjustment of the sectional position and posture are executed as follows. Assume that a parameter of the sectional position is represented as (x, y, z, a, b, c, d, e, f), a converted parameter of the sectional position is (x', y', z', a', b', c', d', e', f'), a vector of parallel moving of the section is represented as (Tx, Ty, Tz). In this case, a conversion equation is represented as follows.

$$\begin{bmatrix} a' & b' & c' \\ d' & e' & f' \end{bmatrix} = \begin{bmatrix} a & b & c \\ d & e & f \end{bmatrix}$$

$$[x'\ y'\ z'\ 1] = [x\ y\ z\ 1]\begin{bmatrix} 1 & 0 & 0 & 0 \\ 0 & 1 & 0 & 0 \\ 0 & 0 & 1 & 0 \\ Tx & Ty & Tz & 1 \end{bmatrix}$$

A rotation "θradian" of the sectional position along x axis is represented as follows.

$$[x'\ y'\ z'] = [x\ y\ z]$$

$$\begin{bmatrix} a' & b' & c' & 1 \\ d' & e' & f' & 1 \end{bmatrix} = \begin{bmatrix} a & b & c & 1 \\ d & e & f & 1 \end{bmatrix}\begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix}$$

A rotation "θradian" of the sectional position along Y axis is represented as follows.

$$[x'\ y'\ z'] = [x\ y\ z]$$

$$\begin{bmatrix} a' & b' & c' & 1 \\ d' & e' & f' & 1 \end{bmatrix} = \begin{bmatrix} a & b & c & 1 \\ d & e & f & 1 \end{bmatrix}\begin{bmatrix} \cos\theta & 0 & -\sin\theta & 0 \\ 0 & 1 & 0 & 0 \\ \sin\theta & 0 & \cos\theta & 0 \\ 0 & 0 & 0 & 1 \end{bmatrix}$$

A rotation "θradian" of the sectional position along Z axis is represented as follows.

$$[x'\ y'\ z'] = [x\ y\ z]$$

$$\begin{bmatrix} a' & b' & c' & 1 \\ d' & e' & f' & 1 \end{bmatrix} = \begin{bmatrix} a & b & c & 1 \\ d & e & f & 1 \end{bmatrix}\begin{bmatrix} \cos\theta & -\sin\theta & 0 & 0 \\ \sin\theta & \cos\theta & 0 & 0 \\ 0 & 0 & 1 & 0 \\ 0 & 0 & 0 & 1 \end{bmatrix}$$

As mentioned-above, converted sectional positions and postures are stored in the sectional position memory 7. As shown in FIG. 8, in case a plurality of sectional positions and postures are changed as one body, same conversion processing is only executed for each section corresponding to the plurality of sectional positions and postures. In order words, the user can change the plurality of sectional positions and postures at once. In short, it is not necessary for the user to change each sectional position and posture one by one. Accordingly, the user's burden of adjustment operation is greatly reduced.

(4) The generated display image is written to the video memory 12 through the display control unit 11 and output through the display unit 5.

As mentioned above, by processing (1)~(4), a plurality of sectional positions are stored in the sectional position memory 7 as one section group. A plurality of section groups are stored in the section position memory 7. Each section group differently corresponds to one object for diagnosis in a living body. Accordingly, the user can arbitrarily select one section group (one object for diagnosis) in the plurality of section groups by the section selector 10. Furthermore, the user can desirably adjust a plurality of sectional positions of the one object for diagnosis at one time while he monitors the sectional images corresponding to the adjusted sectional positions. Accordingly, the user's desired sectional images are quickly obtained by simple operation. As a result, a diagnosis using the medical image for a doctor is effectively improved.

As mentioned-above, in the present invention, a coordinate of the basis point on the sectional plane, a normal vector $\vec{n}$ on the sectional plane, and a vector perpendicular to the normal vector $\vec{u}$ are stored as the parameter of the sectional position. However, coordinates of four peak points of a rectangle representing the sectional plane may be stored. Furthermore, a plurality of sectional positions in one section group may be represented by a matrix of moving and rotation from a basis sectional position in the one section group. In this case, the operation of moving and rotation is executed for the parameter of the basis sectional position. The converted parameter is only stored for the basis sectional position, whereas the matrix of moving and rotation from the basis sectional position is stored for the other sectional positions.

A memory device, including a CD-ROM, floppy disk, hard disk magnetic tape, or semiconductor memory can be used to store instructions for causing a processor or computer to perform the process described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for processing a medical image, comprising:
   a three-dimensional data acquisition unit configured to acquire three-dimensional data of a plurality of objects for diagnosis of a living body;
   a three-dimensional data memory configured to store the three-dimensional data of each of the plurality of objects for diagnosis;
   a sectional position memory configured to store a plurality of sectional positions for each of the plurality of objects for diagnosis;
   a selector configured to select one of the plurality of objects for diagnosis; and
   an image generation unit configured to generate a plurality of sectional images, each image being along a different sectional position, using the three-dimensional data corresponding to the one of the plurality of objects for diagnosis.

2. The apparatus according to claim 1,
   further comprising a sectional position set unit configured to preset the plurality of sectional positions for each of the plurality of objects for diagnosis to said sectional position memory.

3. The apparatus according to claim 2,
   further comprising a display unit configured to display the plurality of sectional images generated by said image generation unit.

4. The apparatus according to claim 1,
   wherein said three-dimensional data acquisition unit scans the living body by a computer tomography, and inputs a plurality of tomographies for each of the plurality of objects for diagnosis of the living body.

5. The apparatus according to claim 4,
   wherein said three-dimensional data memory stores voxel data using the plurality of tomographies as the three-dimensional data of each of the plurality of objects for diagnosis.

6. The apparatus according to claim 3,
   wherein said display initially displays each name of the plurality of objects for diagnosis of the living body in order for the user to select one object for diagnosis.

7. The apparatus according to claim 6,
   wherein said display unit displays the plurality of sectional images of the one object for diagnosis and a three-dimensional image representing each position of the plurality of sectional images when the one object for diagnosis is selected by said selector.

8. The apparatus according to claim 7,
   wherein said sectional position set unit changes each sectional position of the plurality of sectional images of the one object for diagnosis together while the three-dimensional image is displayed.

9. The apparatus according to claim 8,
   wherein said sectional position memory updately stores a plurality of changed sectional positions of the one object for diagnosis in response to a change operation of said sectional position set unit.

10. The apparatus according to claim 9,
    wherein said display unit changeably displays a plurality of changed sectional images and a three-dimensional image representing each sectional position of the plurality of changed sectional images of the one object for diagnosis.

11. A method for processing a medical image, comprising the steps of:
    acquiring three-dimensional data of a plurality of objects for diagnosis of a living body;
    storing the three-dimensional data of each of the plurality of objects for diagnosis;
    storing a plurality of sectional positions for each of the plurality of objects for diagnosis;
    selecting one of the plurality of objects for diagnosis; and
    generating a plurality of sectional images, each image being along a different sectional position, using the three-dimensional data corresponding to the one of the plurality of objects for diagnosis.

12. The method according to claim 11,
    further comprising the step of:
    presenting the plurality of sectional positions for each of the plurality of objects for diagnosis.

13. The method according to claim 12,
    further comprising the step of:
    displaying the plurality of sectional images generated at the generating step.

14. The method according to claim 11,
    wherein the acquiring step includes the steps of:
    scanning the living body by a computer tomography; and
    inputting a plurality of tomographies for each of the plurality of objects for diagnosis of the living body.

15. The method according to claim 14,
    wherein said first storing step includes the step of:
    storing voxel data using the plurality of tomographies as the three-dimensional data of each of the plurality of objects for diagnosis.

16. The method according to claim 13,
    wherein said displaying step includes the step of:
    initially displaying each name of the plurality of objects for diagnosis of the living body in order for the user to select one object for diagnosis.

17. The method according to claim 16,
    wherein said displaying step includes the step of:
    displaying the plurality of sectional images of the one object for diagnosis and a three-dimensional image representing each position of the plurality of sectional images when the one object for diagnosis is selected at the selecting step.

18. The method according to claim 17, further comprising the step of:

changing each sectional position of the plurality of sectional images of the one object for diagnosis together while the three-dimensional image is displayed at the displaying step.

19. The method according to claim 18, wherein said second storing step includes the step of:

storing a plurality of changed sectional positions of the one object for diagnosis in response to a change operation at the changing step.

20. The method according to claim 19, wherein said displaying step includes the step of:

displaying a plurality of changed sectional images and a three-dimensional image representing each sectional position of the plurality of changed sectional images of the one object for diagnosis.

21. A computer-readable memory containing computer-readable instructions to process a medical image, comprising:

an instruction unit for causing a computer to acquire three-dimensional data of a plurality of objects for diagnosis of a living body;

an instruction unit for causing a computer to store the three-dimensional data of each of the plurality of objects for diagnosis;

an instruction unit for causing a computer to store a plurality of sectional positions for each of the plurality of objects for diagnosis;

an instruction unit for causing a computer to select one of the plurality of objects for diagnosis; and an instruction unit for causing a computer to generate a plurality of sectional images, each image being along a different sectional position, using the three-dimensional data corresponding to the one of the plurality of objects for diagnosis.

\* \* \* \* \*